No. 757,844. PATENTED APR. 19, 1904.
F. D. SCOTT.
COMBINED BOX AND CUTTER FOR GOODS IN RIBBON FORM.
APPLICATION FILED DEC. 17, 1902.
NO MODEL.

Witnesses.
Inventor.

No. 757,844. Patented April 19, 1904.

UNITED STATES PATENT OFFICE.

FREDERICK DOUGLAS SCOTT, OF MONTREAL, CANADA.

COMBINED BOX AND CUTTER FOR GOODS IN RIBBON FORM.

SPECIFICATION forming part of Letters Patent No. 757,844, dated April 19, 1904.

Application filed December 17, 1902. Serial No. 135,614. (No model.)

*To all whom it may concern:*

Be it known that I, FREDERICK DOUGLAS SCOTT, a subject of the King of Great Britain, residing at Montreal, in the district of Montreal, Province of Quebec, Canada, have invented certain new and useful Improvements in a Combined Box and Cutter for Goods in Ribbon Form, of which the following is a specification.

My invention relates to improvements in combined boxes and cutters for goods in ribbon form; and the object of my invention is particularly to obviate the necessity of tailors and others handling large pieces of goods each time strips or lengths are needed in the making of clothes, thus economizing both time and material, and also to provide a box which shall be convenient in form for exhibiting, measuring, and cutting ribbons and like goods to facilitate the vending; and it consists, essentially, of a casing of any suitable material having one or more slots in the cover thereof, a plate, preferably of metal, firmly secured to the cover and having a cutting edge remote from the slot, and one or more bobbins suitably journaled in the interior of the casing in alinement with each slot, the various parts being constructed and arranged in detail as hereinafter more particularly described.

Figure 1:
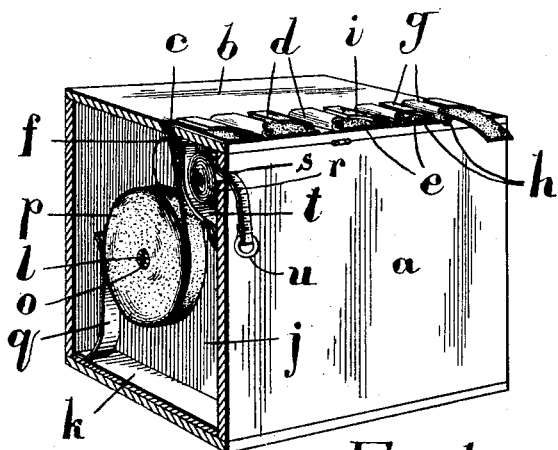
Figure 5:
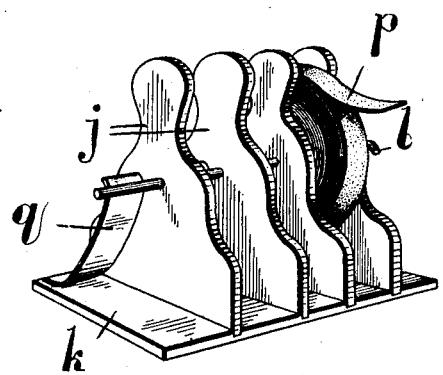
Figure 3:
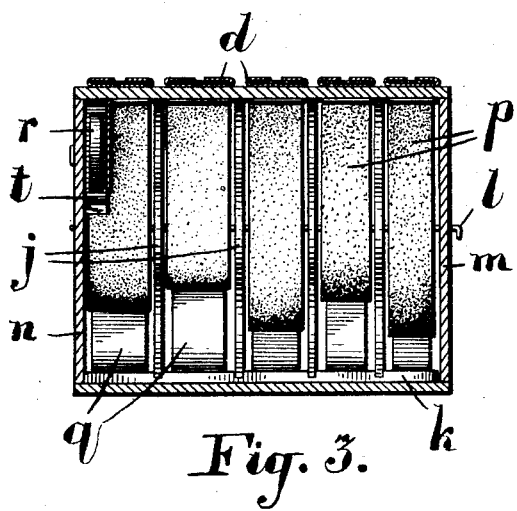
Figure 2:
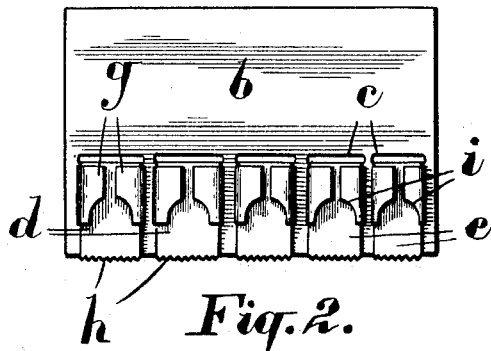
Figure 6:
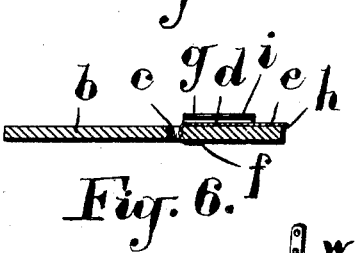
Figure 4:
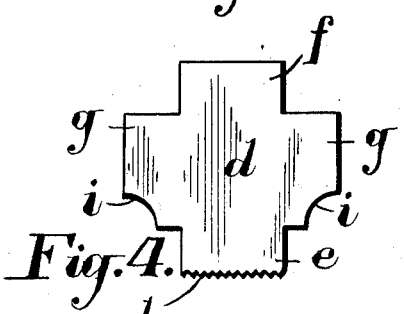
Figure 7:
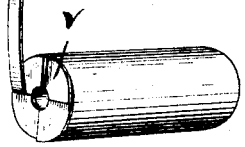

Figure 1 is a sectional perspective view of my device with one end of the casing removed. Fig. 2 is a plan view of the cover. Fig. 3 is a sectional view. Fig. 4 is a detail of a cutter before being formed up. Fig. 5 is a perspective view of a row of removable partitions for the interior of the casing. Fig. 6 is a cross-sectional view. Fig. 7 shows an alternative manner for preventing the unrolling of the material.

Like letters of reference indicate corresponding parts in each figure.

$a$ is the casing, and $b$ the cover thereof.

$c$ represents slots through the cover, preferably of different widths.

$d$ represents plates of metal having the projecting ends $e$ and $f$ and the laterally-extending sides $g$. The plate $d$ in each case is designed to be fixedly attached to the cover $b$, the tongued end $f$ being inserted in the slot $c$ and turned under the cover, while the end $e$ extends to the edge of the cover or slightly beyond and is provided with a serrated or sharp cutting edge $h$. The sides $g$ are turned in to form a guide from a slot $c$. The semicircular cut $i$ in the sides $g$ is designed to facilitate the gripping of the strip of material to pull it through the slot from the inside of the casing $a$.

$j$ represents partitions, preferably mounted on a base $k$ and designed to be set inside the casing $a$.

$l$ is a shaft extending through the center of the ends $m$ and $n$ of the box and also through each of the partitions $j$.

$o$ represents bobbins or spools freely revolving on the shaft $l$ between the partitions $j$.

$p$ is a roll of rubber tissue or other material in ribbon form wound on the bobbin $o$ and having its free end extending through a slot $c$ and between the guiding sides $g$.

$q$ represents flat springs secured to the base $k$ and resting against each roll $p$ and designed to keep the said roll from unwinding of itself.

It must be understood that in my device each division is complete in itself and that while I show a plurality of varying widths I may have only one, though it will be generally considered preferable to have a number, as shown in the drawings.

$r$ is a tape-measure extending through the casing at $s$ and being preferably of the spring variety of tape-measure, so that it may return promptly to its place in the inner casing $t$, with the exception of the ring $u$, when not in use. I may prefer to use in place of this tape-measure an extension-rule measure folding up to the side of the casing; but it is not material to the general working of the device which variety of measure will be used.

Having described the various parts involved in my invention in detail, I shall now more particularly explain the operation and utility thereof. The bobbins $o$ are wound with strips of material—say rubber tissue—and placed in the several divisions formed by the partitions $j$, the shaft $l$ being designed to run through the center of the bobbins and form a bearing therefor. The free ends of the rolls of rubber tissue are then pulled through the slots $c$ and guided between the sides $g$. When it is desired to use a length of strip, the free end is taken between the thumb and forefinger of the user and the strip is pulled out the required length and cut off by a cutter *h*.

This machine is particularly applicable to the casing of strips of rubber tissue for use in tailoring establishments. For instance, at present a tailor is obliged to unfold the sheet of rubber tissue and cut off a strip every time it is wanted in the making of clothes, the consequence being that much time is wasted and also considerable rubber tissue. The convenience of having a box and cutters such as described in the foregoing will be manifest in this particular trade, for the tailor can select his width in an instant and pull out and cut off the exact length without loss of time, the measure *r* being used in determining the length of tissue to be cut. This device is also extremely useful in other ways. As a ribbon-case it will prove invaluable to shops where it is desirable to carefully preserve the ribbon and yet show it off to advantage, for the very ends only of the ribbon will be exposed; but a length may be pulled out at a moment's notice and rerolled on the bobbin if it is not desirable to cut it off.

The casing may be of any suitable material, and in many instances where the device is used as a show-case also it will be preferable to have one or more of the sides of glass. The cutting edges *h* shall be made to suit the material of the rolls, as in the event of the device being used for rubber tissue a saw edge is preferable, whereas for silk ribbon or the like a sharp and curved edge would be required.

The formation of the cutter-plate *d* must be especially mentioned in this invention, for the reason that the sides *g*, turned over as they are, serve the purpose of holding the strip of material in any position to which it may be pulled, preventing the said strip from falling back into the box.

In Fig. 7 I have provided an alternative form for preventing the unrolling of the strip of material on the bobbin when not in use and also for holding the roll firm at all times. This device comprises a ratchet *v*, securely attached to the end of the bobbin *o*, and a pawl *w*, attached immediately thereabove either to a partition or a side wall. This arrangement works similarly to any ordinary pawl and ratchet—that is to say, as arranged it will allow a free rotation of the bobbin forward while the strip is being pulled out, whereas with the point of the pawl against the tooth of the ratchet the bobbin is absolutely prevented from backing up.

What I claim as my invention is—

1. In a device of the class described, the combination with the casing having a slot through one of its faces, of a plate of metal having one end sharpened to form a cutting edge, and the opposite end designed to be inserted in the aforesaid slot, and sides designed to be bent inwardly to form guides from the said slot, as and for the purpose specified.

2. In a device of the class described, in combination, a casing having a plurality of slots through its top side, a plurality of partitions in the interior thereof, a bobbin suitably journaled in each of the divisions made by the said partitions and having a roll of material wound around in a continuous strip, a plurality of metal plates firmly secured to the top side and having a cutting edge, and extending sides forming part thereof bent inwardly to form guides from the said slots, and a flat spring secured at its lower end in the interior of the casing, and resting against the roll of material, as and for the purpose specified.

3. In a device of the class described, a cutter comprising a plate of metal having a cutting edge at one of its projecting ends, and a tongue at the opposite end and extending sides designed to be bent inwardly so as to partially cover the plate, as and for the purpose specified.

4. In a device of the class described, in combination, a casing having a plurality of slots in one of its faces, a cutter opposite to each slot on the edge of the face over which the material to be severed passes and individual guides from each of the slots having their sides turned over and designed to form substantially a covered passage for conveying the material over the cutter as and for the purpose specified.

Signed at Montreal, in the district of Montreal, in the Province of Quebec, Canada, this 13th day of December, 1902.

FREDERICK DOUGLAS SCOTT.

Witnesses:
J. E. L. BLACKMORE,
MAY MADDEN.